US008880069B2

(12) United States Patent
Filipovic et al.

(10) Patent No.: US 8,880,069 B2
(45) Date of Patent: Nov. 4, 2014

(54) COMMUNICATION SYSTEM

(75) Inventors: Milena Filipovic, London (GB); Francesca Serravalle, London (GB); Hiroaki Kuwano, Tokyo (JP); Vivek Sharma, Tokyo (JP)

(73) Assignee: NEC Corporation, Tokyo (JP)

( * ) Notice: Subject to any disclaimer, the term of this patent is extended or adjusted under 35 U.S.C. 154(b) by 83 days.

(21) Appl. No.: 13/260,306

(22) PCT Filed: Apr. 26, 2010

(86) PCT No.: PCT/JP2010/057782
§ 371 (c)(1),
(2), (4) Date: Sep. 24, 2011

(87) PCT Pub. No.: WO2010/126155
PCT Pub. Date: Nov. 4, 2010

(65) Prior Publication Data
US 2012/0021743 A1    Jan. 26, 2012

(30) Foreign Application Priority Data
Apr. 27, 2009   (GB) .................................. 0907187.9

(51) Int. Cl.
*H04W 4/00* (2009.01)
*H04W 4/08* (2009.01)
*H04W 8/18* (2009.01)
*H04W 84/04* (2009.01)

(52) U.S. Cl.
CPC .............. *H04W 4/08* (2013.01); *H04W 84/045* (2013.01); *H04W 8/186* (2013.01)
USPC ......... 455/435.1; 455/436; 715/764; 709/206

(58) Field of Classification Search
USPC .......... 370/338, 331, 328; 445/436, 434, 411, 445/450, 435.1, 424, 435.2, 438, 444; 715/764, 751, 750, 743, 741; 709/206, 709/227
See application file for complete search history.

(56) References Cited

U.S. PATENT DOCUMENTS

2008/0267153 A1*   10/2008   Mukherjee et al. ........... 370/338
2009/0046632 A1*   2/2009    Nanda et al. .................. 370/328
2009/0047960 A1*   2/2009    Gunnarsson et al. ......... 455/436
(Continued)

FOREIGN PATENT DOCUMENTS

WO   WO 2008/134281 A2   11/2008
WO   WO 2008/134281 A3   11/2008
(Continued)

OTHER PUBLICATIONS

Huawei, 3GPP TSG-RAN WG3#63bls, R3-090932, Seoul, Korea, Mar. 23-26, 2009.
(Continued)

*Primary Examiner* — Mahendra Patel
(74) *Attorney, Agent, or Firm* — McGinn IP Law Group, PLLC

(57) ABSTRACT

A communication system is described in which a home base station operating in a hybrid access mode is able to provide preferential connectivity to mobile communication devices that are members of a closed subscriber group associated with the home base station compared to mobile communication devices that are not members of the closed subscriber group.

12 Claims, 12 Drawing Sheets

(56) References Cited

U.S. PATENT DOCUMENTS

| | | | |
|---|---|---|---|
| 2009/0070694 A1* | 3/2009 | Ore et al. | 715/764 |
| 2009/0094680 A1* | 4/2009 | Gupta et al. | 726/3 |
| 2009/0156208 A1* | 6/2009 | Vesterinen et al. | 455/435.1 |
| 2009/0168727 A1* | 7/2009 | Somasundaram et al. | 370/332 |
| 2009/0238117 A1* | 9/2009 | Somasundaram et al. | 370/328 |
| 2010/0240366 A1* | 9/2010 | Bi et al. | 455/435.1 |
| 2011/0009095 A1* | 1/2011 | Uemura et al. | 455/411 |
| 2011/0281584 A1* | 11/2011 | Sander et al. | 455/436 |
| 2012/0122460 A1* | 5/2012 | Dalsgaard et al. | 455/444 |

FOREIGN PATENT DOCUMENTS

| | | |
|---|---|---|
| WO | WO 2009/001269 A2 | 12/2008 |
| WO | WO 2009/001269 A4 | 12/2008 |
| WO | WO 2009/043002 A2 | 4/2009 |
| WO | WO 2009/043002 A3 | 4/2009 |
| WO | WO 2009/044317 A3 | 4/2009 |
| WO | WO 2009/044318 A2 | 4/2009 |
| WO | WO 2009/044318 A3 | 4/2009 |
| WO | WO 2009/047972 A1 | 4/2009 |

OTHER PUBLICATIONS

Samsung, 3GPP TSG SA WG2 Meeting #71, TD-S2-091098, Budapest, Hungary, Feb. 16-20, 2009.
NEC, 36 PP TS6 RAN 2 Meeting #66, USA, R2-092913, San Francisco, May 4-8, 2009.
ISR in PCT/2010/057782 dated Oct. 11, 2010.
Japanese Office Action dated Oct. 9, 2013, with English translation thereof.

* cited by examiner

COMMUNICATION SYSTEM

The present application is based on and claims priority from international patent application No. PCT/JP2010/057782, filed on Apr. 26, 2010, which is based on and claims priority from the United Kingdom application No. GB 0907187.9, filed on Apr. 27, 2009, the entire contents of which are incorporated herein by reference.

TECHNICAL FIELD

The present invention relates to mobile telecommunication networks, particularly but not exclusively networks operating according to the ($3^{rd}$ Generation Partnership Project) 3GPP standards or equivalents or derivatives thereof. The invention has particular although not exclusive relevance to the provision of access to home base stations and more specifically the access prioritization for home base stations operating using a hybrid access mode.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX (Worldwide Interoperability for Microwave Access) network. In this case, the home base station is commonly referred to as a femto cell. For simplicity, the present application will use the term HNB to refer to any such home base station and will use the term NodeB generically to refer to other base stations (such as the base station for the macro cell in which a HNB operates). The HNB will provide radio coverage (for example, 3G/4G/WiMAX) within the home and will connect to the core network via a suitable public network (for example via an ADSL link to the Internet) and in the case of the 3GPP standards, via an optional HNB gateway (HNB-GW) which typically will aggregate traffic from several HNBs.

The HNB may be configured to operate using one of a plurality of access modes, namely: 'closed' in which the HNB operates as a closed subscriber group (CSG) cell; 'hybrid' in which the HNB operates as a CSG cell where at the same time, non-members are allowed access; and 'open' in which the HNB operates as a normal (non-CSG) cell.

When the HNB is in the hybrid access mode, and services cannot be provided to a CSG member due to a shortage of HNB resources, established communications of non-members via a CSG cell may be diverted to another cell. Furthermore, to minimise the impact of non-member established communication on CSG members, the network may allow the data rate of established communication of non-members to be reduced. However, the need to establish the CSG membership status of a particular mobile telephone in order to determine which established connections belong to members, and which belong to non-members has the potential to have a negative impact on already scarce resources. Moreover, when a congested HNB receives new connection requests it may admit requests from non-member devices which may result in an undesirable degradation in service for member devices, or may reject requests from member devices due to a lack of available resources when the congestion is being caused by established connections with non-member devices.

SUMMARY

There is also currently no efficient way of informing a decision by a source HNB (or radio network controller (RNC) of a macro cell) as to which target cells are open to receive handover requests for mobile telephones connected to the source HNB/RNC.

Although for efficiency of understanding for those of skill in the art, the invention will be described in detail in the context of a 3G system, the principles of the invention can be applied to other systems (such as WiMAX) in which mobile devices or User Equipment (UE) communicate with one of several base stations with the corresponding elements of the system changed as required.

Accordingly, preferred embodiments of the present invention aim to provide methods and apparatus which overcome or at least alleviate the above issues.

According to one aspect of the present invention there is provided a mobile communication device for connection in a communication network, the mobile communication device comprising: means for receiving (e.g. a receiver, tranceiver, or the like) information identifying a closed subscriber group (CSG) associated with a home base station; means for identifying (e.g. an identifier, an identification module, a processor, or the like) the CSG associated with the home base station from the received information; means for determining (e.g. a determiner, determination module, processor, or the like) whether the mobile communication device is a member of the identified CSG associated with the home base station; means for generating a message including an indication of whether the mobile communication device is a member of the identified CSG, in dependence on a result of a determination made by the determining means; and means for sending (e.g. an transmitter, a tranceiver, or the like) the generated message.

The message generated by the generation means may comprise a connection request message report and the sending means may be operable to send the message to the home base station.

The message generated by the generation means may be a RRC connection request.

The controlling means may be operable to control access by diverting an established connection to a neighbouring cell in dependence on whether the mobile communication device is determined to be a member of the CSG associated with the home base station.

The controlling means may be operable to control access by initiating a reduction in the data rate of an established connection in dependence on whether the mobile communication device is determined to be a member of the CSG associated with the home base station.

The controlling means may be operable to control access by initiating a reduction in the data rate of an established connection in dependence on whether the established connection belongs to a mobile communication device which has been determined to be a member of the CSG associated with the home base station.

The controlling means may be operable to control access by diverting an established connection to a neighbouring cell in dependence on whether the established connection belongs to a mobile communication device which has been determined to be a member of the CSG associated with the home base station.

The message generated by the generation means may comprise a measurement report and the sending means may be operable to send the message to a further base station.

According to another aspect of the present invention there is provided a home base station via which a plurality of mobile communication devices are connectable in a communication network, the home base station having an associated closed subscriber group (CSG) and comprising: means for receiving (e.g. a receiver, tranceiver, or the like) a connection request from a mobile communication device wherein the connection request includes an indication of whether the mobile communication device is a member of the CSG associated with the home base station; means for monitoring (e.g. a monitor) congestion levels for the home base station and for indicating when the home base station is in a congested situation; means for determining (e.g. a determiner, determination module, processor, or the like) if the mobile communication device requesting connection is a member of the CSG associated with the home base station from the indication of whether the mobile communication device is a member of the CSG associated with the home base station; and means for controlling (e.g. a controller, processor, or the like) access to the home base station, when the monitoring means indicates the home base station is in a congested situation, in dependence on whether or not the mobile communication device is determined to be a member of the CSG associated with the home base station.

The controlling means may be operable to control access by rejecting, allowing, or diverting the connection request in dependence on whether the mobile communication device is determined to be a member of the CSG associated with the home base station.

The home base station may further comprise means for storing (e.g. a memory) the indication of whether the mobile communication device is a member of the CSG associated with the home base station for subsequent use in control processing.

According to another aspect of the present invention there is provided a home base station via which a plurality of mobile communication devices are connectable in a communication network, the home base station having an associated closed subscriber group (CSG) and comprising: means for receiving (e.g. a receiver, tranceiver, or the like) connection requests from a plurality of mobile communication devices wherein each connection request includes a respective indication of whether the mobile communication device making the request is a member of the CSG associated with the home base station; means for establishing respective connections (e.g. a connection establisher) with each mobile communication device making a request; means for storing (e.g. a memory) information indicating a membership status for each established connection based on the respective indication of whether the mobile communication device is a member of the CSG associated with the home base station; means for monitoring (e.g. a monitor) congestion levels for the home base station and for indicating when the home base station is in a congested situation; and means for controlling (e.g. a controller, processor or the like) the established connections, when the monitoring means indicates the home base station is in a congested situation, in dependence on the respective membership status for each established connection.

The controlling means may be operable to control the established connections, when the monitoring means indicates the home base station is in a congested situation, by diverting an established connection when its respective membership status indicates that the mobile communication device for which the connection was established is not a member of the CSG.

The controlling means may be operable to control the established connections by initiating a reduction of resources for an established connection when its respective membership status indicates that the mobile communication device for which the connection was established is not a member of the CSG.

According to another aspect of the present invention there is provided a home base station via which a plurality of mobile communication devices are connectable in a communication network, the home base station having an associated closed subscriber group (CSG) the home base station comprising: means for generating system information including information indicating whether a mobile communication device which is not a member of the CSG is allowed to connect via the home base station; means for broadcasting the system information to mobile communication devices in the vicinity; and means for monitoring (e.g. a monitor) congestion levels for the home base station; wherein the generation means is operable, in response to a change in the congestion levels, to generate new system information in which the information indicating whether a mobile communication device which is not a member of the CSG is allowed to connect via the home base station is changed between: information indicating a mobile communication device which is not a member of the CSG is allowed to connect; and information indicating a mobile communication device which is not a member of the CSG is not allowed to connect; and wherein the broadcasting means is operable to broadcast the new system information to mobile communication devices in the vicinity.

The generation means may operable, in response to an increase in the congestion levels, to generate new system information in which the information indicating whether a mobile communication device which is not a member of the CSG is allowed to connect is changed to: information indicating a mobile communication device which is not a member of the CSG is not allowed to connect.

The generation means may operable, in response to a decrease in the congestion levels, to generate new system information in which the information indicating whether a mobile communication device which is not a member of the CSG is not allowed to connect via the home base station is changed to: information indicating a mobile communication device which is not a member of the CSG is allowed to connect.

According to another aspect of the present invention there is provided a home base station via which a plurality of mobile communication devices are connectable in a communication network, the home base station having an associated closed subscriber group (CSG) and being operable in any of a plurality of access modes the home base station comprising: means for monitoring (e.g. a monitor) congestion levels for the home base station; and means for changing access mode, in response to a change in the congestion levels, between: (i) an access mode in which new connections from mobile communication devices which are not members of the CSG are allowed and (ii) an access mode in which new connections from mobile communication devices which are not members of the CSG are inhibited.

The access changing means may be operable, in response to an increase in the congestion levels, to change to the access mode in which new connections from mobile communication devices which are not members of the CSG are inhibited.

The access changing means may be operable, in response to a decrease in the congestion levels, to change to the access mode in which new connections from mobile communication devices which are not members of the CSG are allowed.

According to another aspect of the present invention there is provided a communication node via which a plurality of mobile communication devices are connectable in a communication network, the communication node comprising:

means for receiving (e.g. a receiver, tranceiver, or the like) a measurement report from a mobile communication device having an established connection with the communication node, wherein the measurement report includes an indication of whether the mobile communication device is a member of a CSG associated with a home base station; means for determining (e.g. a determiner, determination module, processor, or the like) whether handover of the established connection to the home base station is allowable based on the indication of whether the mobile communication device is a member of the CSG associated with the home base station; and means for initiating (e.g. an initiator, initiation module, or the like) a handover of the established connection to the home base station in dependence on whether the handover is determined to be allowable.

According to another aspect of the present invention there is provided a mobile communication device for connection in a communication network, the mobile communication device comprising: means for generating a measurement report including an indication of whether the mobile communication device is a member of a CSG associated with a home base station; and means for sending (e.g. an transmitter, a tranceiver, or the like) the measurement report to another base station.

According to another aspect of the present invention there is provided a communication node via which a plurality of mobile communication devices are connectable in a communication network, the communication node comprising: means for receiving (e.g. a receiver, tranceiver, or the like) a measurement report from a mobile communication device having an established connection with the communication node, wherein the measurement report includes information identifying an access mode for the home base station; means for determining (e.g. a determiner, determination module, processor, or the like) whether handover of another established connection to the home base station is allowable based on the information identifying an access mode for a home base station; and means for initiating (e.g. an initiator, initiation module, or the like) a handover of the established connection, or the another established connection, to the home base station in dependence on whether the handover is determined to be allowable.

According to another aspect of the present invention there is provided a mobile communication device for connection in a communication network, the mobile communication device comprising: means for generating a measurement report including information identifying an access mode for a home base station; and means for sending (e.g. an transmitter, a tranceiver, or the like) the measurement report to another base station.

According to another aspect of the present invention there is provided a communication node via which a plurality of mobile communication devices are connectable in a communication network, the communication node comprising: means for receiving (e.g. a receiver, tranceiver, or the like) information identifying an access mode for a home base station over an interface with the home base station; means for determining (e.g. a determiner, deteimination module, processor, or the like) whether handover of an established connection to the home base station is allowable based on the information identifying an access mode for the home base station; and means for initiating (e.g. an initiator, initiation module, or the like) a handover of the established connection to the home base station in dependence on whether the handover is determined to be allowable.

According to another aspect of the present invention there is provided a method performed by a mobile communication device in a communication network, the method comprising: receiving information identifying a closed subscriber group (CSG) associated with a home base station; identifying the CSG associated with the home base station from the received information; determining whether the mobile communication device is a member of the identified CSG associated with the home base station; generating a message including an indication of whether the mobile communication device is a member of the identified CSG, in dependence on a result of a determination made by the determining means; and sending the generated message.

According to another aspect of the present invention there is provided a method performed by a home base station via which a plurality of mobile communication devices are connectable in a communication network, the home base station having an associated closed subscriber group (CSG), the method comprising: receiving a connection request from a mobile communication device wherein the connection request includes an indication of whether the mobile communication device is a member of the CSG associated with the home base station; monitoring congestion levels for the home base station and indicating when the home base station is in a congested situation; determining if the mobile communication device requesting connection is a member of the CSG associated with the home base station from the indication of whether the mobile communication device is a member of the CSG associated with the home base station; and controlling access to the home base station, when a congested situation has been indicated in the indicating step, in dependence on whether or not the mobile communication device is determined to be a member of the CSG associated with the home base station in the determining step.

According to another aspect of the present invention there is provided a method performed by a home base station via which a plurality of mobile communication devices are connectable in a communication network, the home base station having an associated closed subscriber group (CSG), the method comprising: receiving connection requests from a plurality of mobile communication devices wherein each connection request includes a respective indication of whether the mobile communication device making the request is a member of the CSG associated with the home base station; establishing respective connections with each mobile communication device making a request; storing information indicating a membership status for each established connection based on the respective indication of whether the mobile communication device is a member of the CSG associated with the home base station; monitoring congestion levels for the home base station and for indicating when the home base station is in a congested situation; and controlling the established connections, when the monitoring means indicates the home base station is in a congested situation, in dependence on the respective membership status for each established connection.

According to another aspect of the present invention there is provided a method performed in a home base station via which a plurality of mobile communication devices are connectable in a communication network, the home base station having an associated closed subscriber group (CSG), the method comprising: generating system information including information indicating whether a mobile communication device which is not a member of the CSG is allowed to connect via the home base station; broadcasting the system information to mobile communication devices in the vicinity; and monitoring congestion levels for the home base station; generating, in response to a change in the congestion levels, new system information in which the information indicating whether a mobile communication device which is not a member of the CSG is allowed to connect via the home base station is changed between: information indicating a mobile communication device which is not a member of the CSG is allowed to connect; and information indicating a mobile communication device which is not a member of the CSG is not allowed to connect; and broadcasting the new system information to mobile communication devices in the vicinity.

According to another aspect of the present invention there is provided a method performed by a home base station via which a plurality of mobile communication devices are connectable in a communication network, the home base station having an associated closed subscriber group (CSG) and being operable in any of a plurality of access modes, the method comprising: monitoring congestion levels for the home base station; changing access mode, in response to a change in the congestion levels, between: (i) an access mode in which new connections from mobile communication devices which are not members of the CSG are allowed and (ii) an access mode in which new connections from mobile communication devices which are not members of the CSG are inhibited.

According to another aspect of the present invention there is provided a method performed by a communication node via which a plurality of mobile communication devices are connectable in a communication network, the method comprising: receiving a measurement report from a mobile communication device having an established connection with the communication node, wherein the measurement report includes an indication of whether the mobile communication device is a member of a CSG associated with a home base station; determining whether handover of the established connection to the home base station is allowable based on the indication of whether the mobile communication device is a member of the CSG associated with the home base station; and initiating a handover of the established connection to the home base station in dependence on whether the handover is determined to be allowable.

According to another aspect of the present invention there is provided a method performed by a mobile communication device in a communication network, the method comprising: generating a measurement report including an indication of whether the mobile communication device is a member of a CSG associated with a home base station; and sending the measurement report to another base station.

According to another aspect of the present invention there is provided a method performed by a communication node via which a plurality of mobile communication devices are connectable in a communication network, the method comprising: receiving a measurement report from a mobile communication device having an established connection with the communication node, wherein the measurement report includes information identifying an access mode for the home base station; determining whether handover of another established connection to the home base station is allowable based on the information identifying an access mode for a home base station; and initiating a handover of the established connection, or the other established connection, to the home base station in dependence on whether the handover is determined to be allowable.

According to another aspect of the present invention there is provided a method performed by a mobile communication device in a communication network, the method comprising: generating a measurement report including information identifying an access mode for a home base station; and sending the measurement report to another base station.

According to another aspect of the present invention there is provided a method performed by a communication node via which a plurality of mobile communication devices are connectable in a communication network, the method comprising: receiving information identifying an access mode for a home base station over an interface with the home base station; determining whether handover of an established connection to the home base station is allowable based on the information identifying an access mode for the home base station; and initiating a handover of the established connection to the home base station in dependence on whether the handover is determined to be allowable.

BRIEF DESCRIPTION OF THE DRAWINGS

Embodiments of the invention will now be described, by way of example, with reference to the accompanying drawings in which.

EXEMPLARY EMBODIMENTS

Overview

Figure 1:
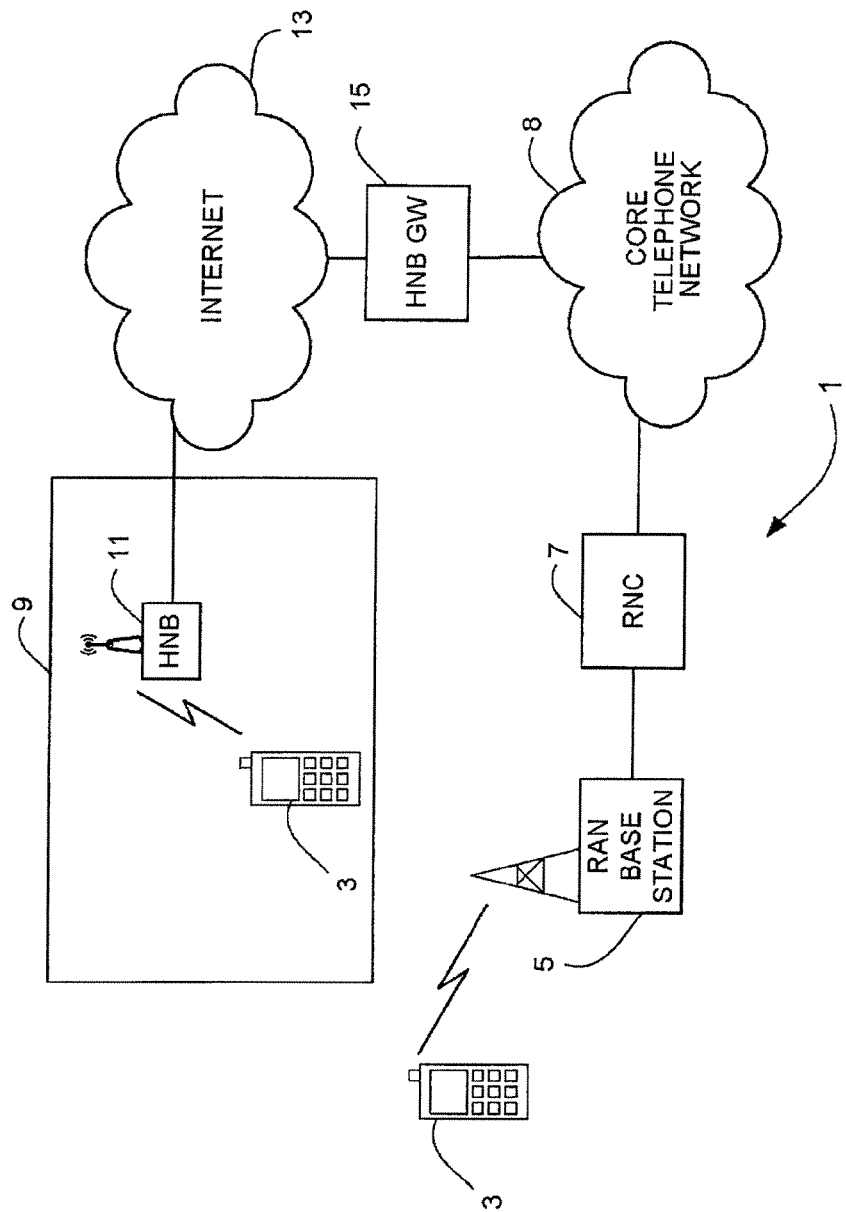
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a macro cell of a 3G Radio Access Network (RAN) base station 5, a Radio Network Controller (RNC) 7 and a core telephone network 8 when the user is away from a 'home' base station (HNB) based cell 9, which he may be permitted to access. In the telecommunication system 1 the user may also communicate with the other users (not shown) via the cell 9 of an HNB 11, a public data network (in this case the Internet 13), a home base station gateway (HNB-GW) 15, and the core telephone network 8 when the user is within the HNB based cell 9. The HNB 11 will typically connect to the respective HNB-GW 15 via a suitable Internet connection such as an ADSL (Asymmetric Digital Subscriber Line) or cable connection 16 and is programmed with the IP address of the HNB-GW 15 so that all uplink communications are transmitted via the respective HNB-GW 15.

The HNB 11 is configured to operate using one of a plurality of access modes, including: a 'closed' mode in which only the members of a closed subscriber group (CSG) associated with the HNB 11 are allowed access; a 'hybrid' mode in which both members and non-members of a CSG associated with the HNB 11 are allowed access; and an 'open' mode in which the HNB 11 operates as a normal (non-CSG) cell not having an associated CSG.

As those skilled in the art will appreciate, each HNB 11 can communicate with a number of different mobile telephones 3. It will be further appreciated that there may be any number of HNB based cells 9 and that the same HNB-GW 15 may be shared by a plurality of HNBs 11.

Mobile Telephone

Figure 2:
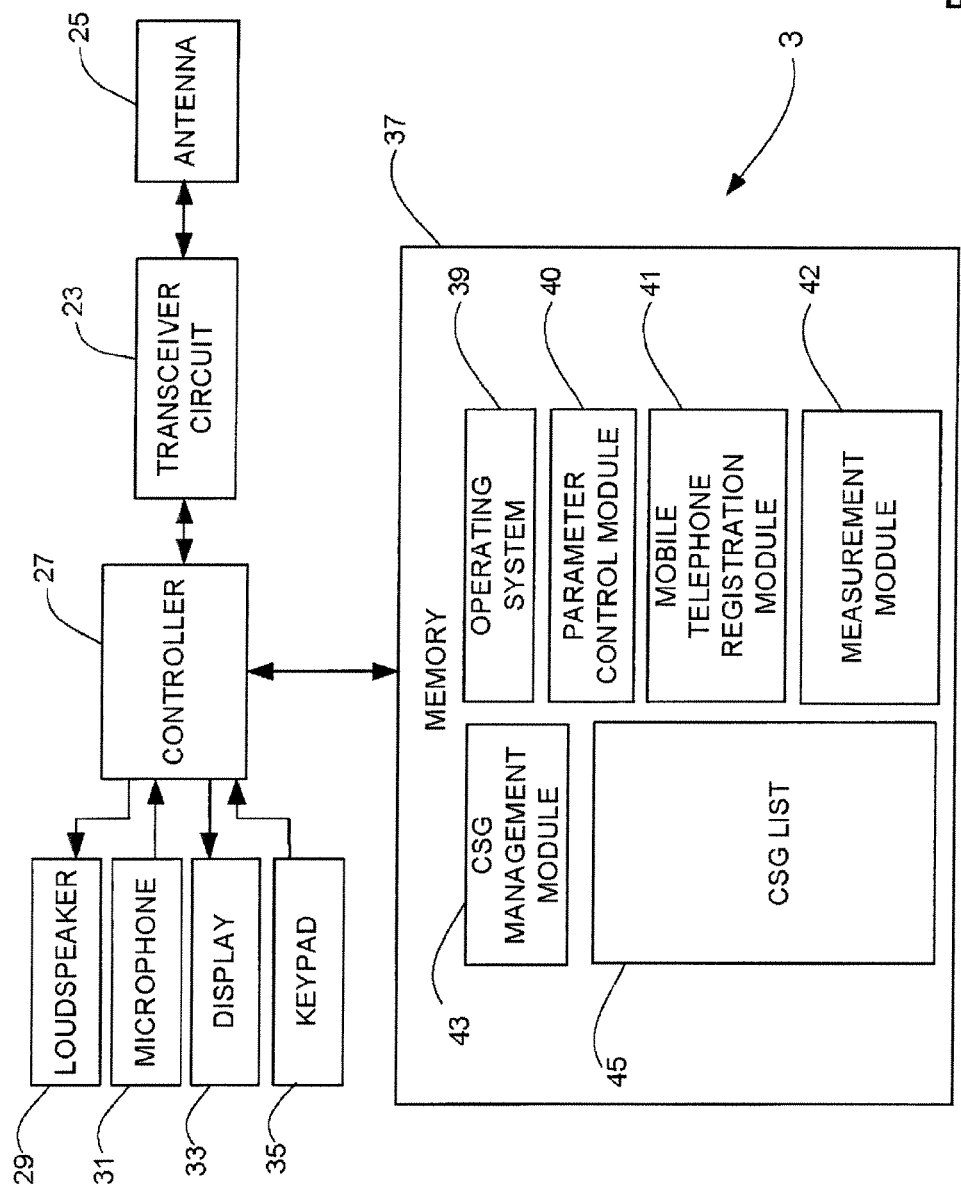
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the RAN base station 5 or the HNB 11 via one or more antennae

25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a mobile telephone registration module 41, and a CSG management module 43.

In this embodiment: the mobile telephone registration module 41 allows selection of the home base station 11 when the mobile telephone 3 is within range of their HNB 11; and the CSG management module 43 maintains at least one CSG list 45 containing details of the CSGs of which the mobile telephone 3 is a member (e.g. an operator controlled 'Allowed CSG list' and/or a user controlled a 'User CSG list').

It will be appreciated that, the selection of the home base station 11 may be automatic or manually controlled by the user and that the CSG list 45 may be stored in the memory 37 of the mobile telephone 3 and/or in a Universal Subscriber Identity Module (USIM) (not shown).

As will be described in more detail below, when an HNB 11 selected for connection is operating in the hybrid access mode, and has an associated CSG of which the mobile telephone 3 is a member, the mobile telephone registration module 41 of the mobile telephone 3 is operable to generate a connection request (e.g. an RNC Connection Request) for initiating connection to the HNB 11 which request includes information identifying whether the mobile telephone 3 is a member of the closed subscriber group to the HNB 11 in question.

Home Base Station

Figure 3:
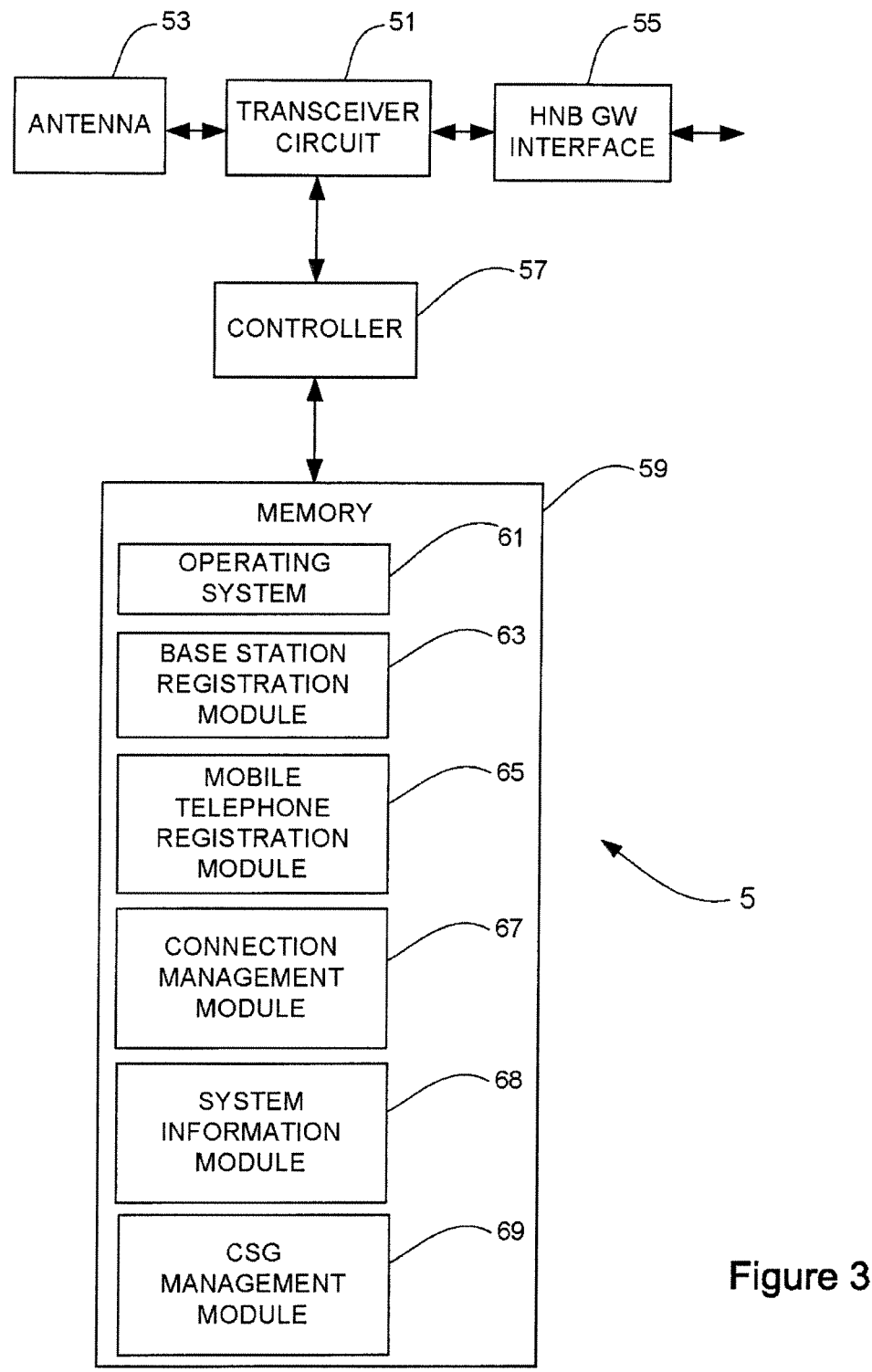
FIG. 3 is a block diagram of a home base station forming part of the system shown in FIG. 1.

FIG. 3 is a block diagram illustrating the main components of the home base station (HNB) 11 shown in FIG. 1. As shown, the HNB 11 includes a transceiver circuit 51 which is operable to transmit signals to, and to receive signals from, the mobile telephone 3 via one or more antennae 53 and which is operable to transmit signals to and to receive signals from the HNB-GW 15 via an HNB-GW interface 55. The operation of the transceiver circuit 51 is controlled by a controller 57 in accordance with software stored in memory 59. The software includes, among other things, an operating system 61, a base station registration module 63, a mobile telephone registration module 65, a connection management module 67, a system information module 68, and a CSG management module 69.

The base station registration module 63 is operable to register the HNB with the HNB-GW 15 and the mobile telephone registration module 65 is operable to register the mobile telephone 3 with the HNB 11 and with the HNB-GW 15. The connection management module 67 is operable to manage the connections of mobile telephones camped on the cell 9 of the HNB 11. The system information module 68 is operable to broadcast system information relating to the cell 9, to mobile telephones 3 in the vicinity. The CSG management module 69 is operable for configuring the HNB 11 to operate under one of the CSG access modes ('closed', 'hybrid', or 'open') and for setting up CSGs associated with the HNB 11.

As will be described in more detail below, the mobile telephone registration module 65 is operable, when operating in the hybrid access mode, to manage attempted registration by mobile telephones 3, such that a mobile telephone 3 that is a member of a CSG associated with the HNB 11, is given preferential access compared to a mobile telephone 3 which is not a member (non-CSG). The connection management module 67 is operable to monitor and manage established connections such that preferential connection conditions may be provided for a mobile telephone 3 that is a member of a CSG associated with the HNB 11 as compared to a non-CSG mobile telephone.

In the above description, the mobile telephone 3 and the home base station 11 are described, for ease of understanding, as having a number of discrete modules (base station/mobile telephone registration modules, the parameter control module, and the connection/CSG management modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Exemplary Implementations

Exemplary implementations will now be described, by way of example, with reference to the operation of the various components of the telecommunication system 1 illustrated in FIG. 1 and the flow diagrams of FIGS. 4 to 12.

(1) Connection Establishment for a UE in Idle Mode

Figure 4:
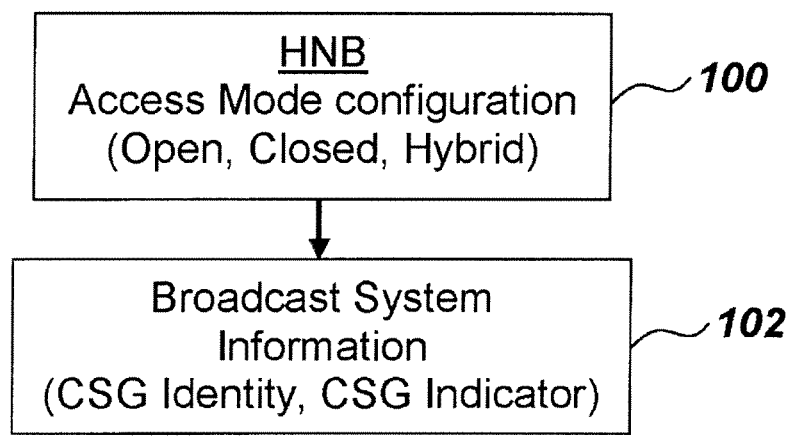
FIGS. 4 to 12 are flow diagrams illustrating the operation of various implementations of the system of FIG. 1.
Figure 5:
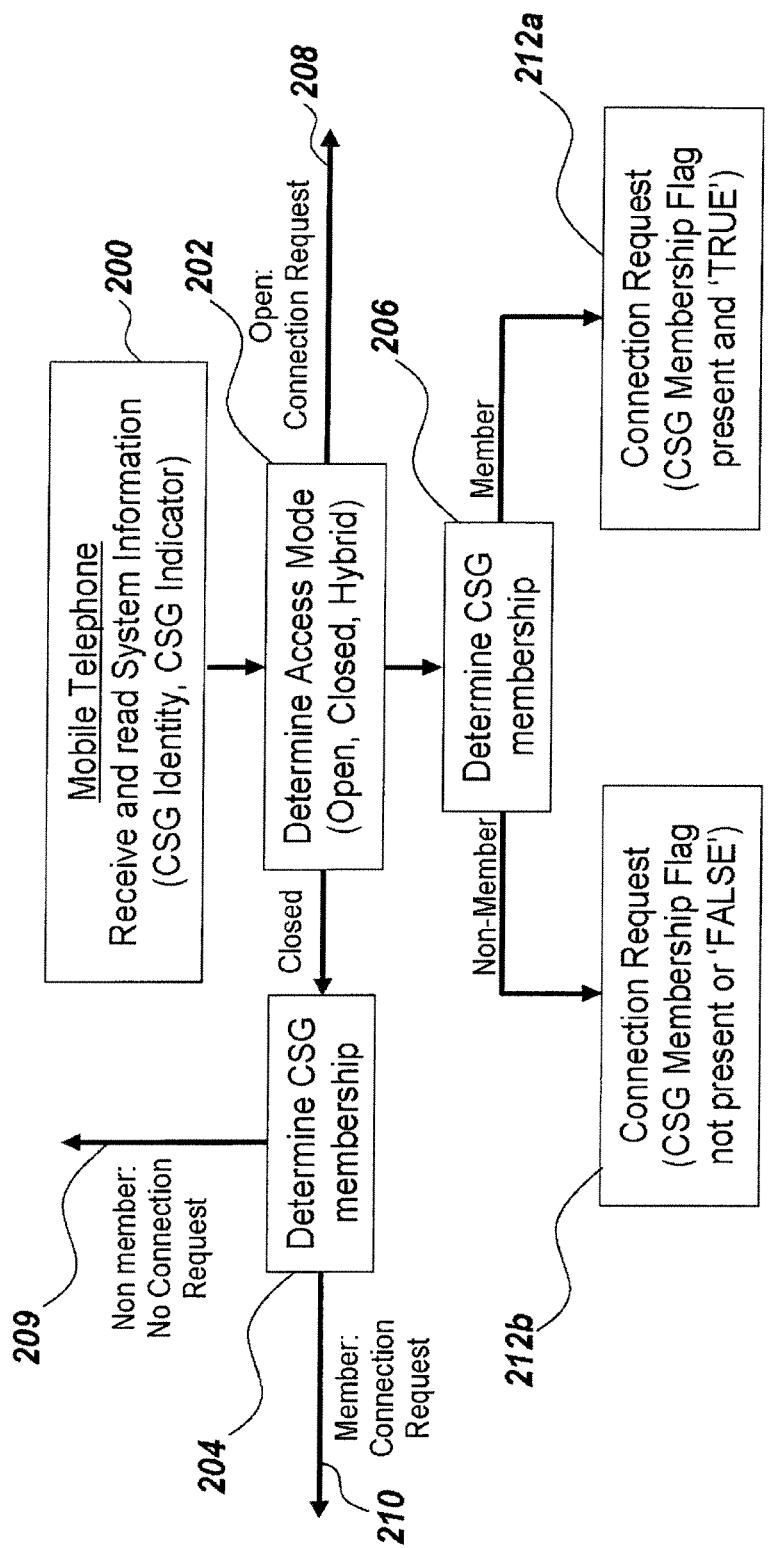
Figure 6:
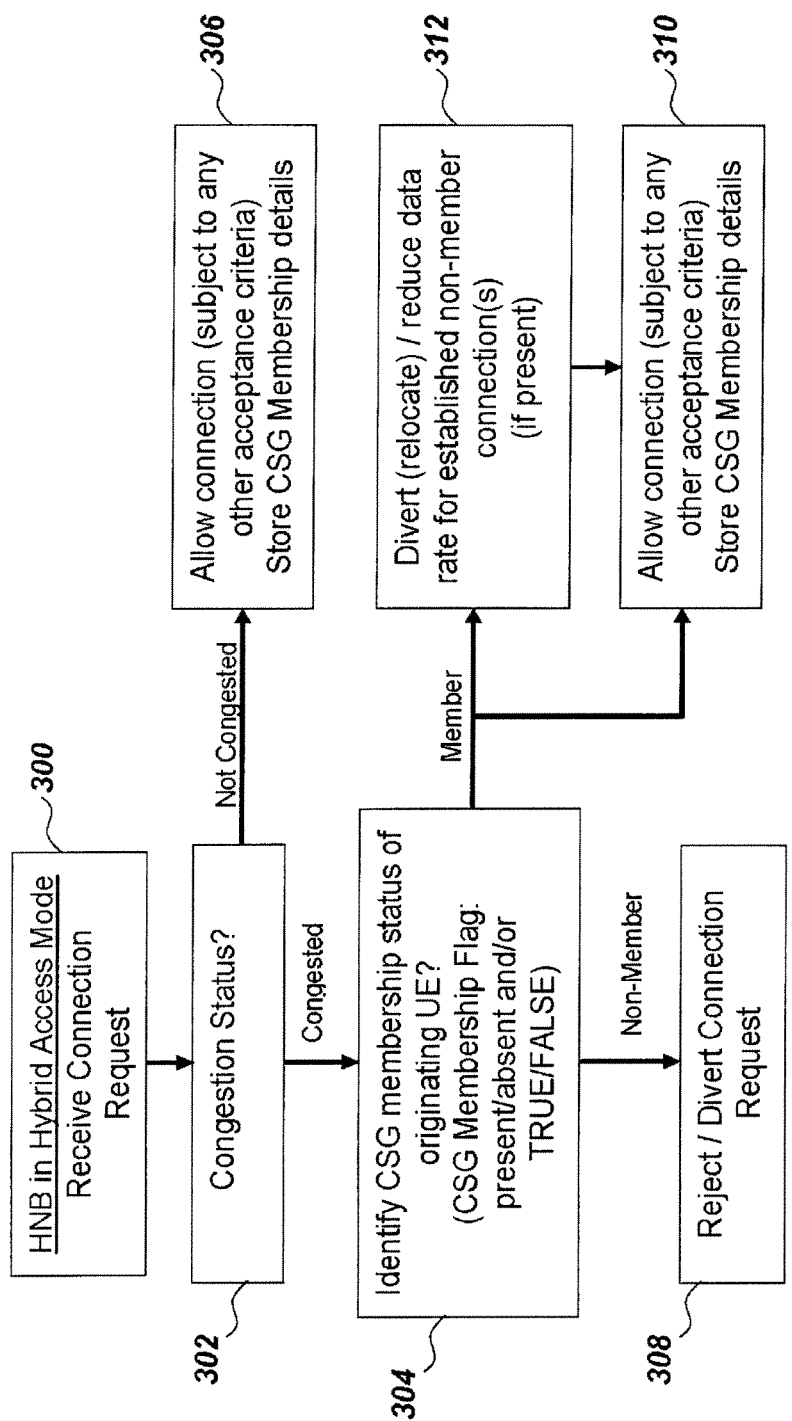

FIGS. 4 to 6 illustrate the operation of an exemplary implementation of the telecommunication system of FIG. 1 in which the mobile telephone 3 begins in an idle state/mode and subsequently requires connection to an HNB 11.

Access Mode Configuration and Broadcast

As shown in FIG. 4, the CSG management module 69 of the HNB 11 is operable for configuring the HNB 11 to operate under one of the CSG access modes ('closed', 'hybrid', or 'open') and for setting up a CSG associated with the HNB 11 (if the hybrid or closed CSG access mode is configured), as shown at step 100.

After the CSG access mode for the HNB 11 has been configured and the CSG has been set up, the system information module 68 is operable to broadcast system information, including information identifying the CSG access mode of the HNB 11, to mobile telephones 3 in the vicinity, at suitable times (step 102).

The information identifying the CSG access mode typically comprises, depending on the access mode, a CSG Indicator (or CSG Indication) information element (IE)/flag for indicating whether or not the HNB 11 is operating in the closed CSG access mode and a CSG Identity information element for identifying a CSG set up for the HNB 11 as follows:

- If the HNB is operating in an open access mode, the CSG Indicator (or CSG Indication) IE will be set to FALSE (or will simply not be present) and the CSG Identity IE will not be included, in the information identifying the CSG access mode.
- If the HNB is operating in a hybrid access mode, the CSG Indicator (or CSG Indication) IE will also be set to FALSE (or will simply not be present) but in this case the CSG Identity IE of the associated CSG will be included in the information identifying the CSG access mode.
- If the HNB is operating in a closed access mode, the CSG Indicator (or CSG Indication) IE will be set to TRUE and the CSG Identity IE of the associated CSG will be included in the information identifying the CSG access mode.

Connection Request Initiation

As shown in FIG. 5 the mobile telephone 3 is operable, in idle mode, to receive the system information broadcast by the HNB 11 of a cell 9 in which it is located and to extract (read) the information identifying the CSG access mode of the HNB 11 broadcasting it (step 200). The CSG management module 43 of the mobile telephone 3 is operable to determine the CSG access mode of the HNB 11 from the extracted information (step 202).

The CSG management module 43 is further operable, in the event that the CSG access mode is determined to be a closed or hybrid access mode, to determine if the CSG is represented in the CSG list 45 (steps 204 and 206) and, accordingly, whether the mobile telephone 3 is a member of that subscriber group.

Open Access Mode

In the event that the CSG access mode is an open access mode, then there is no CSG associated with the HNB. Accordingly, when connection is required, the mobile telephone registration module 41 of the mobile telephone 3 is operable to generate a connection request (208) for transmission to the HNB 11 and the connection process proceeds in the normal manner for connecting to a normal (non-CSG) base station as a skilled person will understand.

Closed Access Mode

In the event that the access mode is a closed access mode and the mobile telephone 3 is not a member of the CSG associated with the HNB 11 (209), the mobile telephone 3 will not attempt to connect to that HNB 11. Otherwise, when connection is required and the mobile telephone 3 is determined to be a member of the CSG, the mobile telephone registration module 41 is operable to generate a connection request (210) for transmission to the HNB 11, and the connection process proceeds in the normal manner for connecting to a home base station operating in a closed access mode, as a skilled person will understand.

Hybrid Access Mode

The mobile telephone registration module 41 is also operable, in the event that the access mode is a hybrid access mode and when connection is required, to generate a connection request (steps 212a and 212b) for transmission to the HNB 11. When the mobile telephone 3 has been identified to be a member of the CSG associated with the HNB 11 the mobile telephone registration module 41 generates a request which includes a CSG membership information element to act as a flag (or in which the CSG membership flag is set to a particular value, e.g. 'TRUE') for indicating the mobile telephone's membership of the subscriber group (step 212a). Contrastingly, in step 212b, when the mobile telephone 3 has been determined not to be a member of the CSG associated with the HNB 11 the mobile telephone registration module 41 generates a request which does not include the CSG membership flag (or in which the CSG membership flag is set to a different value, e.g. 'FALSE').

The mobile telephone 3 is operable to send the generated request to the HNB 11 via its transceiver circuit 23 and antenna 25.

Handling New Connection Requests in Hybrid Mode

As seen in FIG. 6, the HNB 11 (operating in hybrid access mode) is operable to receive the connection request via its antenna 53 and transceiver circuit 51 (step 300).

The mobile telephone registration module 65 of the HNB 11 is operable to establish whether the HNB 11 is in a congested situation (e.g. there is a shortage of HNB 11 resources) based, for example, on information received from the connection management module 67 about the nature of any existing connections and/or on information about any other mobile telephones attempting to make a connection (step 302).

The mobile telephone registration module 65 is further operable to identify the presence or absence of the CSG membership indication flag (and/or to determine its value) and accordingly, to determine whether the mobile telephone 3 from which the connection request originated is a member of the CSG associated with the HNB 11 (step 304).

The mobile telephone registration module 65 of the HNB 11 is operable to respond to the connection request in dependence on whether the HNB 11 is in a congested situation (step 302), and whether the mobile telephone 3 is a member of the CSG (step 304) as follows:

(a) If the HNB 11 is not in a congested situation, then connection is allowed irrespective of CSG membership (subject to any other typical connection acceptance criteria) (step 306).

(b) If the HNB 11 is in a congested situation and the mobile telephone 3 is not a member of the CSG then the connection is either rejected, or diverted to another cell (e.g. a neighbouring cell 9 of an HNB 11 or a macro cell) (step 308).

(c) If the HNB 11 is in a congested situation and the mobile telephone 3 is a member of the CSG and connection is allowed (subject to any other typical connection acceptance criteria) (step 310).

As described previously, the connection management module 67 is operable to monitor and manage established connections. More particularly, the connection management module 67 is operable to store membership details for established connections (e.g. the CSG membership flag or other data from which the CSG membership can be derived) and to assist preferential establishment of a new connection with a member mobile telephone 3 (step 312) as follows:

(a) by initiating relocation of a non-member mobile telephone 3 (if one is connected) to another cell (e.g. a neighbouring cell 9 of an HNB 11 or a macro cell); and/or (b) by initiating a reduction in the data rate of an established connection with a non-member mobile telephone 3 (if one is connected).

Accordingly, the implementation described with reference to FIGS. 4 to 6 provide an efficient mechanism by which an HNB 11 experiencing congestion can determine which connection request should be allowed and which should be rejected in dependence on whether the mobile telephone 3 originating the request is a member of a CSG associated with the device or not. The implementation also allows the HNB 11 experiencing congestion to provide preferential connection conditions to member devices by redirecting non-member devices or initiating a reduction in their data rate.

(2) Connection Management for UEs with Established Connections

Figure 7:
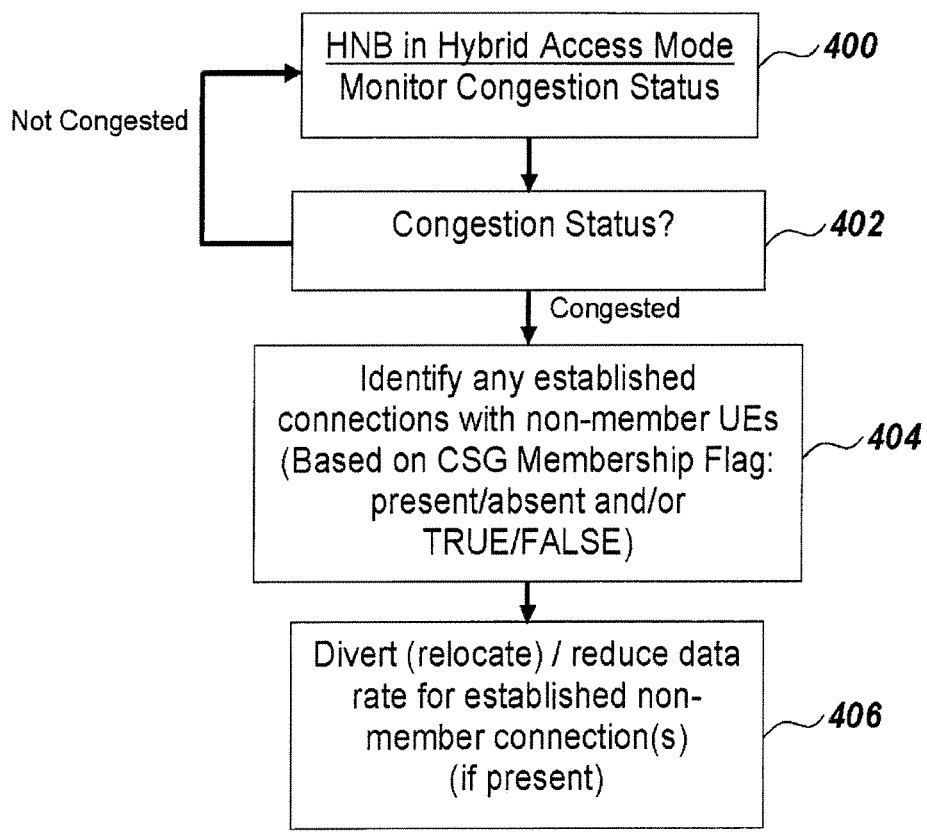

FIG. 7, illustrates the operation of an exemplary implementation of the telecommunication system 1 of FIG. 1 in which the HNB 11 has a plurality of established connections.

Handling Established Connection Requests in Hybrid Mode

As described with reference to FIG. 6, the connection management module 67 is operable to store membership details for established connections (e.g. the CSG membership flag or other data from which the CSG membership can be derived). As seen in FIG. 7, the connection management module 67 is further operable to monitor the level of congestion (steps 400 and 402) and, when the HNB 11 enters a congested situation from a non-congested situation, to identify non-member connections from the stored CSG membership information (step 404). Moreover, the connection management module 67 is further operable to assist provision of preferential access to member mobile telephones 3 having established connections (step 406) as follows:

(a) by initiating relocation of a non-member mobile telephone 3 (if one is connected) to another cell (e.g. a neighbouring cell 9 of an HNB 11 or a macro cell); and/or (b) by initiating a reduction in the data rate of an established connection with a non-member mobile telephone 3 (if one is connected).

It will be appreciated that the implementation illustrated in FIG. 7 is complementary to that illustrated in FIGS. 4 to 6 and may be implemented with or separately to that implementation.

Accordingly, the implementation described with reference to FIG. 7 provides an efficient mechanism by which an HNB 11 experiencing congestion can provide preferential connection conditions to member devices with established connections by redirecting non-member devices or initiating a reduction in their data rate.

(3) Inhibiting Connection Requests from Non-Members—Changing CSG Access Mode

Figure 8:
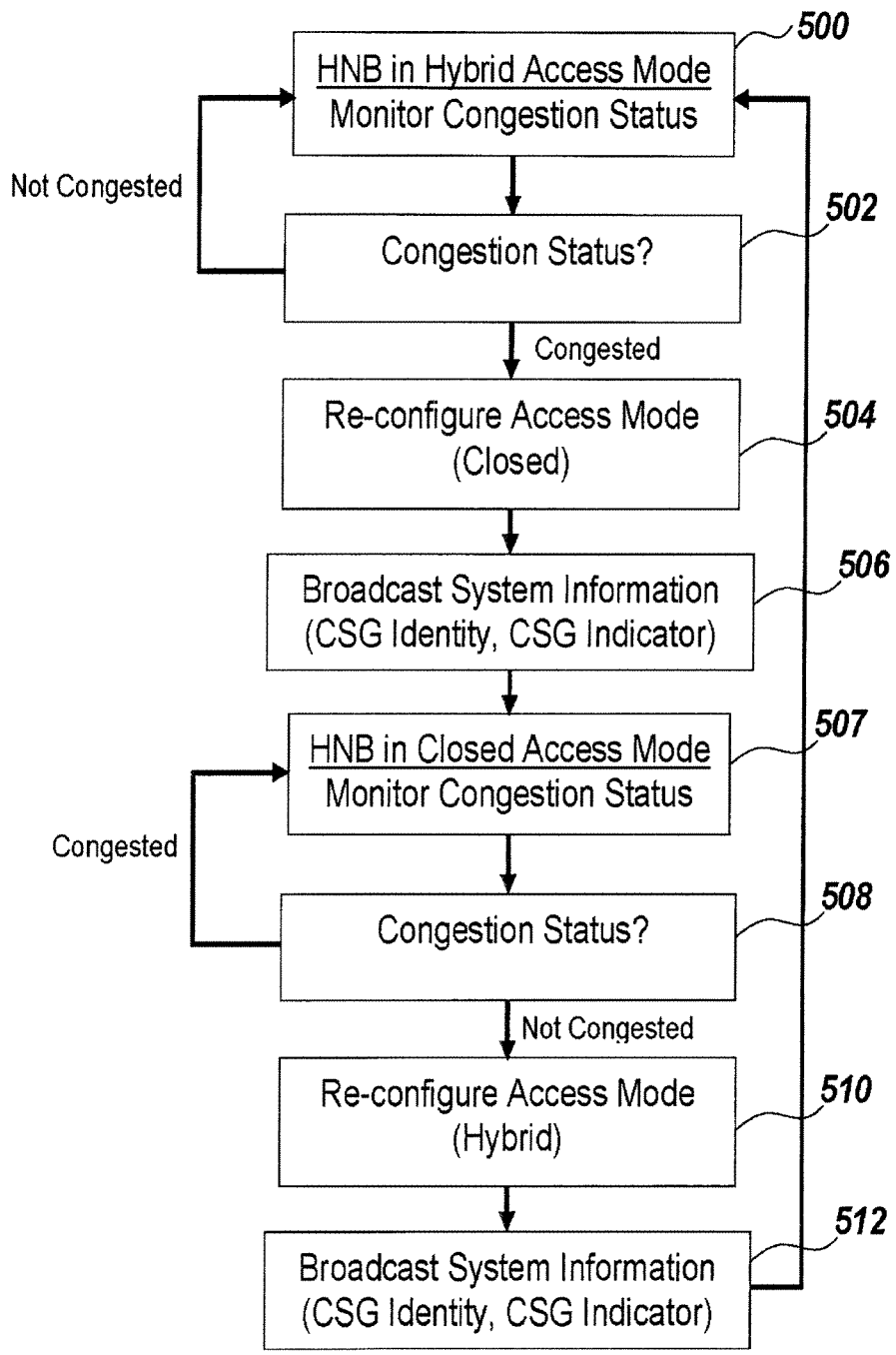

FIG. 8, illustrates the operation of another exemplary implementation of the telecommunication system 1 of FIG. 1 in which new connection requests from non member mobile telephones 3 are suppressed without the need to provide the CSG membership flag in the connection request.

In accordance with the implementation shown in FIG. 8, the HNB 11 is operable to monitor congestion and monitor the level of congestion (steps 500 and 502). The CSG management module 69 of the HNB 11 is configured to respond to a change from a non-congested state to a congested state by changing the access mode from the hybrid access mode to the closed access mode (step 504). The system information module 68 is operable to broadcast system information, including information identifying the new closed CSG access mode of the HNB 11 (CSG Indicator/Indication IE set to TRUE), to mobile telephones 3 in the vicinity either substantially immediately, or at the next suitable time according to its normal broadcast cycle, and at suitable intervals thereafter (step 506).

A mobile telephone 3 (in idle mode) according to this implementation is operable to receive the newly broadcast system information and to act on it in substantially the manner described with reference to FIG. 5 (for steps 200, 202 and 210).

Accordingly, the mobile telephone 3 is operable, in idle mode, to receive the system information broadcast by the HNB 11 of a cell 9 in which it is located and to extract (read) the information identifying the CSG access mode of the HNB 11 broadcasting it. The CSG management module 43 of the mobile telephone 3 is operable to determine the CSG access mode of the HNB 11 from the extracted information. On determining that the CSG access mode is a closed access mode the CSG management module 43 is further operable to determine if the associated CSG is represented in the CSG list 45 and, accordingly, whether the mobile telephone 3 is a member of that subscriber group.

In the event that the mobile telephone 3 is not a member of the CSG associated with the HNB 11, the mobile telephone 3 will not attempt to connect to that HNB 11. Otherwise, when connection is required and the mobile telephone 3 is determined to be a member of the CSG, the mobile telephone registration module 41 is operable to generate a connection request for transmission to the HNB 11, and the connection process proceeds substantially in the normal manner for connecting to a home base station operating in a closed access mode, as a skilled person will understand.

The HNB 11 is further operable to continue monitoring congestion after a change in access mode and monitor the level of congestion (steps 507 and 508). The CSG management module 69 of the HNB 11 is configured to respond to a change from a congested state to a non-congested state by changing the access mode from the closed access mode to the hybrid access mode (step 510). The system information module 68 is operable to broadcast system information, including inforniation identifying the return to the hybrid CSG access mode of the HNB 11 (CSG Indicator/Indication IE set to FALSE), to mobile telephones 3 in the vicinity (which may be substantially immediately or at another suitable time according to its normal broadcast cycle) (step 512).

The mobile telephone 3 is operable, in idle mode, to receive the system information (identifying the return to the hybrid mode) broadcast by the HNB 11 and to extract (read) the information identifying the CSG access mode of the HNB 11 broadcasting it. The CSG management module 43 of the mobile telephone 3 is operable to determine the CSG access mode of the HNB 11 from the extracted information. On determining that the CSG access mode is a hybrid mode, the mobile telephone registration module 41 of the mobile telephone is operable, when a connection is required, to generate a connection request for transmission to the HNB 11 which is subsequently accepted by the HNB 11 (subject to any other connection criteria).

Accordingly, when the HNB 11 enters a congested situation, new connection requests from non-member mobile telephones 3 are suppressed, advantageously without the need for the CSG membership flag, without the need for the mobile telephone 3 to determine CSG membership when it has identified the access mode of the HNB 11 to be a hybrid mode, and without the need for the HNB 11 to analyse the membership of devices making a connection request. Similarly, when the HNB 11 becomes less congested, new connection requests from non-member mobile telephones 3 are no longer suppressed and hence non-members are, once again, allowed to connect.

(4) Inhibiting Connection Requests from Non-Members—Maintaining CSG Access Mode

Figure 9:
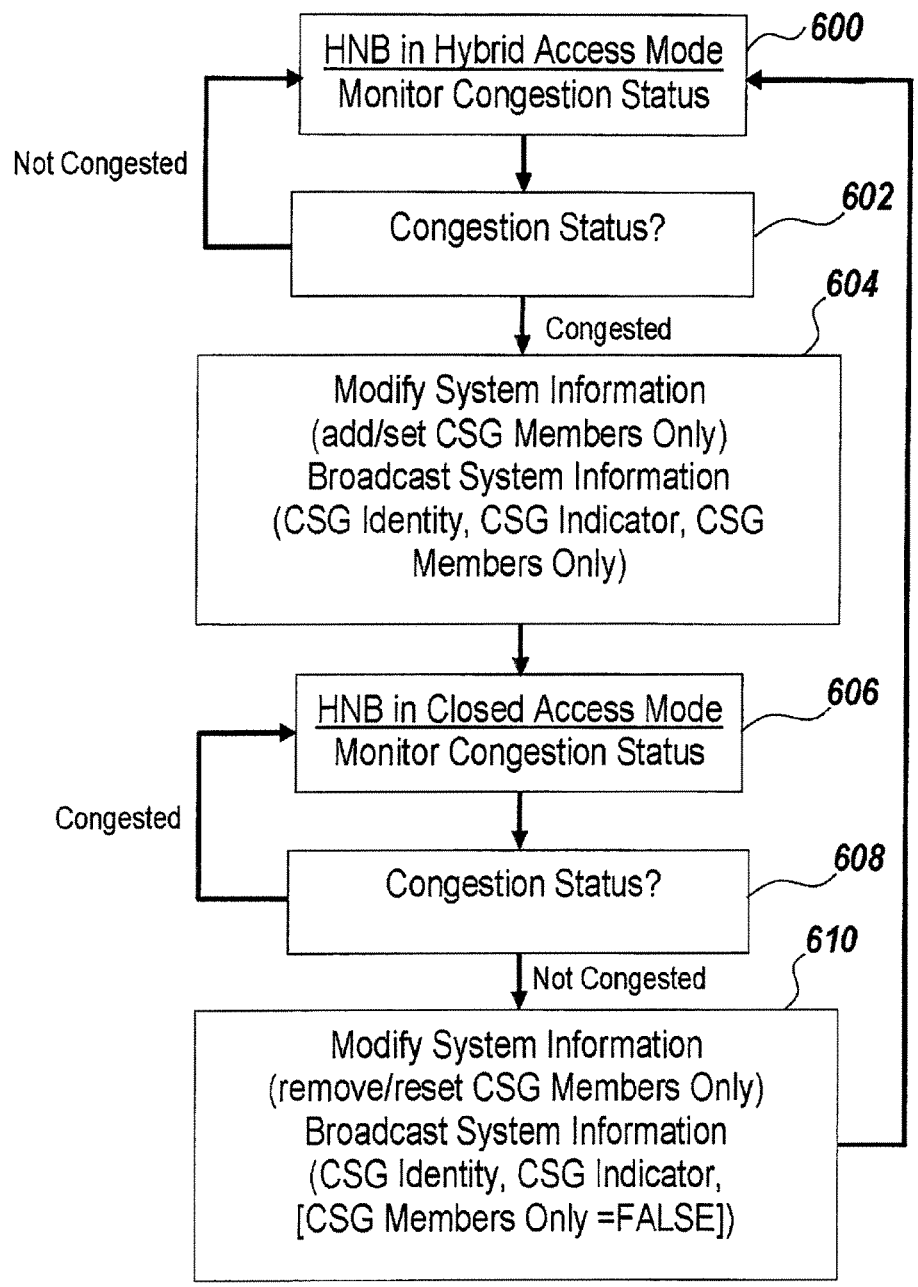

FIG. 9, illustrates the operation of another exemplary implementation of the telecommunication system 1 of FIG. 1 in which new connection requests from non member mobile telephones 3 are suppressed without the need to provide the CSG membership flag in the connection request and, in this implementation, without the need to change the CSG access mode.

In accordance with the implementation shown FIG. 9, the HNB 11 is operable to monitor congestion and monitor the level of congestion (steps 600 and 602). The CSG management module 69 of the HNB 11 is configured to respond to a change from a non-congested state to a congested state by modifying the system information associated with CSGs to include a 'CSG members only' (or 'Only CSG members allowed') flag (or set it to 'TRUE') for indicating that new connections are restricted to member mobile telephones 3 only (step 604). The system information module 68 is operable to broadcast system information, including the CSG members only flag and the information identifying the CSG access mode of the HNB 11, to mobile telephones 3 in the vicinity either substantially immediately, or at the next suitable time according to its normal broadcast cycle, and at suitable intervals thereafter (step 604).

The mobile telephone 3 is operable, in idle mode, to receive the system information broadcast by the HNB 11 and to extract (read) the CSG members only flag with the information identifying the CSG access mode. The CSG management module 43 of the mobile telephone 3 is operable to determine whether access is restricted to members only when identifying the CSG access mode of the HNB 11 from the extracted information. On determining that the CSG access mode is a hybrid mode, and that access is restricted to members only, the CSG management module 43 is operable to determine if the associated CSG is represented in the CSG list 45 and, accordingly, whether the mobile telephone 3 is a member of that subscriber group.

In the event that the mobile telephone 3 is not a member of the CSG associated with the HNB 11, and that access is found to be restricted to members only, the mobile telephone 3 will not attempt to connect to that HNB 11. Otherwise, when connection is required and the mobile telephone 3 is determined to be a member of the CSG, the mobile telephone registration module 41 is operable to generate a connection request for transmission to the HNB 11, and the connection process proceeds substantially in the normal manner for connecting to a home base station as a skilled person will understand.

The HNB 11 is further operable to continue monitoring congestion for a change in the level of congestion (steps 606 and 608). The CSG management module 69 of the HNB 11 is configured to respond to a change from a congested state to a non-congested state by modifying the system information associated with CSGs to remove a 'CSG members only' (or 'Only CSG members allowed') flag (or reset it to 'FALSE') to indicate that new connections are no longer restricted to member mobile telephones 3 only. The system information module 68 is operable to broadcast system information, without the CSG members only flag (or with it reset to 'FALSE') and with the information identifying the CSG access mode of the HNB 11, to mobile telephones 3 in the vicinity either substantially immediately, or at the next suitable time according to its normal broadcast cycle, and at suitable intervals thereafter (step 610).

The mobile telephone 3 is operable, in idle mode, to receive the system information broadcast by the HNB 11 and to extract (read) the information identifying the CSG access mode of the HNB 11 broadcasting it. The CSG management module 43 of the mobile telephone 3 is operable to determine the CSG access mode of the HNB 11, and to establish that new connections are not restricted to member mobile telephones 3 only, from the extracted information. On determining that the CSG access mode is a hybrid mode and that access is not restricted to members, the mobile telephone registration module 41 of the mobile telephone is operable, when a connection is required, to generate a connection request for transmission to the HNB 11 which is subsequently accepted by the HNB 11 (subject to any other connection criteria).

Accordingly, when the HNB 11 enters a congested situation, new connection requests from non-member mobile telephones 3 are suppressed, advantageously without the need for the CSG membership flag, without the need to change CSG access mode, and without the need for the HNB 11 to analyse the membership of devices making a connection request. Similarly, when the HNB 11 becomes less congested, new connection requests from non-member mobile telephones 3 are no longer suppressed and hence non-members are, once again, allowed to connect.

It will be appreciated that whilst the implementations illustrated in FIGS. 8 and 9 advantageously remove the need for the CSG membership flag they do not preclude the provision of the flag in the connection request or in other messages, for example, to allow storage of membership details for established connections. Such stored membership details may be useful, for example, for the purpose of providing preferential treatment of established member connections over established non-member connections and/or to allow established non-member connections to be redirected (or their resources limited) so that new connections can be established with members using preferential connection conditions.

It will be further appreciated that in both these implementations the HNB 11 may obtain information on the CSG membership of a mobile telephone 3 in the vicinity from another node (for example, from a node in the Core Telephone Network 8 or from an HNB-GW 15) rather than from the mobile telephone 3.

(5) Acquiring CSG Membership Information for Neighbouring Cells—UE in Connected Mode (HNB or Other Base Station/RNC)

Figure 10:
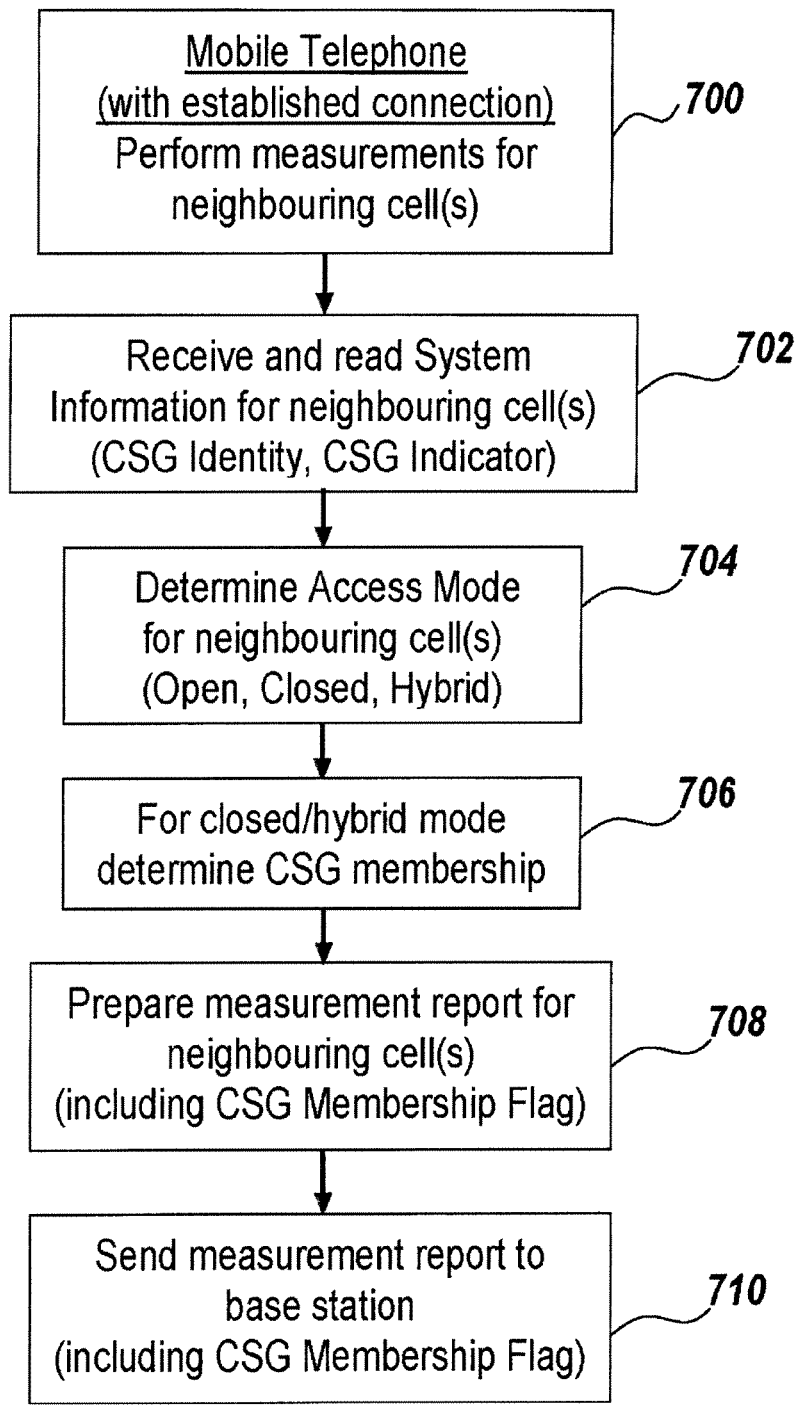

FIG. 10, illustrates the operation of another exemplary implementation of the telecommunication system 1 of FIG. 1 in which a base station (HNB 11 or other base station 5) and/or associated RNC 7 (if applicable) is able to obtain information from a mobile telephone 3 with an established connection, on the telephone's membership of a CSG associated with another cell 9 (HNB 11) in the vicinity (e.g. a neighbouring cell) for the purposes of possible relocation/handover to the other cell 9.

Measurement Reporting

In accordance with the implementation shown in FIG. 10, a measurement module 42 (FIG. 2) of the mobile telephone 3 is operable, when the mobile telephone 3 is in a connected mode/state, to perform measurements (e.g. Intra frequency, inter frequency and inter RAT mobility, Quality, UE internal, positioning measurements, or the like) in other cells 9 (e.g. neighbouring/nearby cells) in the vicinity (step 700). The measurements may be automatic or may be explicitly requested by or via the base station 11, 5.

The mobile telephone 3 is operable to receive system information broadcast by the HNB 11 of the nearby cell 9 (e.g. as described with reference to FIG. 4) and to extract (read) the information identifying the CSG access mode (CSG Indicator/Indication and/or CSG Identity) of the HNB 11 broadcasting it (step 702). The CSG management module 43 of the mobile telephone 3 is operable to determine the CSG access mode of the nearby HNB 11 from the extracted information (step 704) and in the event that the CSG access mode is determined to be a closed or hybrid access mode, to determine if the CSG is represented in the CSG list 45 and, accordingly, whether the mobile telephone 3 is a member of the subscriber group (step 706) associated with the nearby/neighbouring cell.

The measurement module 42 is further operable to prepare a measurement report (step 708) including details of the measurements performed in step 700. If the mobile telephone has been determined to be a member of the CSG associated with the nearby/neighbouring cell (in step 706), a CSG membership flag is included (e.g. set to 'TRUE') in the measurement report. If the mobile telephone has been determined not to be a member of the CSG associated with the nearby/neighbouring cell (in step 706), the CSG membership flag is set to a different value (e.g. 'FALSE') in the measurement report.

The mobile telephone 3 is operable to send the measurement report to the base station (step 710) 5, 11 to which it is connected (for possible onward transmission to the RNC 7 if applicable).

Handover Decisions

The base station 11, 5 (or RNC 7) is operable to make handover/relocation/redirection decisions for the mobile telephone 3, taking the presence/absence of the CSG membership indication (or its 'TRUE'/'FALSE' value) into account, as follows:

(a) If the nearby/neighbouring cell (e.g. 'target cell' of the 'target radio network') has a hybrid access mode, the HNB 11 or RNC 7 of the source radio network may decide not to handover the mobile telephone 3 to the target cell if the UE is not a CSG member;

(b) If the cell of the target radio network has a closed access mode and the mobile telephone 3 has indicated that it is not a CSG member of the target cell, the HNB 11 or RNC 7 of the source radio network will not allow handover of the mobile telephone 3 to the target cell.

(6) Obtaining Access Mode Information for Neighbouring/Nearby Cells

Figure 11:
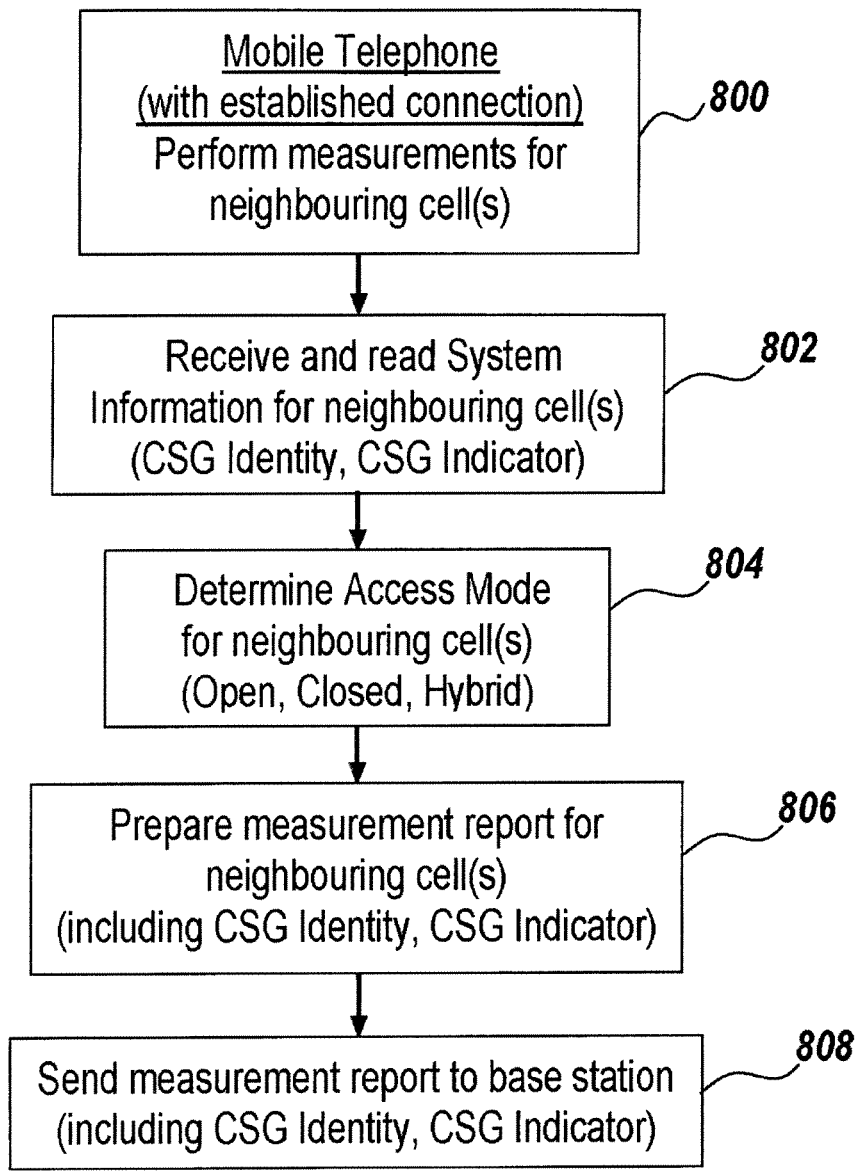
Figure 12:
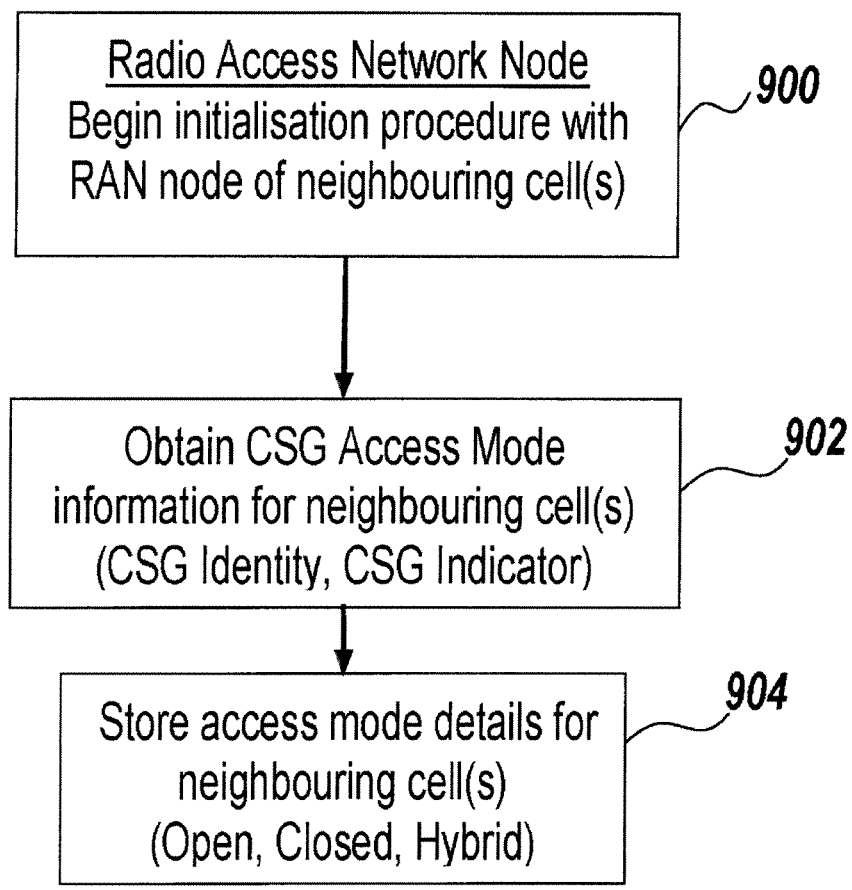

FIGS. 11 and 12 illustrate the operation of implementations of the system of FIG. 1 in which the source radio access network is operable to obtain information regarding the access mode (open, hybrid or closed) of the neighbouring cells (e.g. to allow the source radio access network to perform handover decisions as described above) in at least one of the following ways:

(a) From a mobile telephone via radio resource control measurement reporting (e.g. on the UTRA RAN (Radio Access Network) interface (Uu interface)) or (FIG. 11);

(b) Directly from the neighbouring cells via a protocol used on an interface between two radio access network (RAN) nodes (e.g. based on the EUTRAN X2 Application Protocol (X2AP) for a Long Term Evolution (LTE)) (FIG. 12).

(a) Obtaining Access Mode Information from the UE

In accordance with the implementation shown in FIG. 11, the measurement module 42 of the mobile telephone 3 is operable, when the mobile telephone 3 is in a connected mode/state, to perform measurements (e.g. Intra frequency, inter frequency and inter RAT mobility, Quality, UE internal, positioning measurements, or the like) in other cells 9 (e.g. neighbouring/nearby cells) in the vicinity (step 800). The measurements may be automatic or may be explicitly requested by or via the base station 11, 5.

The mobile telephone 3 is operable to receive system information broadcast by the HNB 11 of the nearby cell 9 (e.g. as described with reference to FIG. 4) and to extract (read) the information identifying the CSG access mode (CSG Indicator/Indication and/or CSG Identity) of the HNB 11 broadcasting it (step 802). The CSG management module 43 of the mobile telephone 3 is operable to determine the CSG access mode of the nearby HNB 11 from the extracted information (step 804).

The measurement module 42 is further operable to prepare a measurement report (step 806) including details of the measurements performed in step 800 including information identifying the access mode of the neighbouring cell 9 (e.g. The CSG Indicator/Indication and/or CSG Identity). It will be appreciated that, whilst determining the access mode is advantageous for compatibility with other implementations (e.g. as described with reference to FIG. 10), in this implementation the mobile telephone 3 need not identify the access mode itself (as described) but may instead forward the appropriate information to the base station 11, 5 to which it is connected without determining the access mode.

The mobile telephone 3 is operable to send the measurement report to the base station (step 808) 5, 11 to which it is connected (for possible onward transmission to the RNC 7 if applicable).

The base station 11, 5 (or RNC 7) is operable to make handover/relocation/redirection decisions for the mobile telephone 3, taking the CSG mode into account as described previously (e.g. with reference to FIG. 10).

(b) Obtaining Access Mode Information from Neighbouring Cells

In accordance with the implementation shown FIG. 12, during the initialisation of a connection between a radio access network node (e.g. the base station 5, RNC 7, or HNB 11) of a first cell and a radio access network node (e.g. the base station 5, RNC 7, or HNB 11) of a neighbouring cell, the nodes are operable to exchange information related to their access modes (e.g. the CSG Indicator/Indication and/or CSG Identity). Accordingly, the network node of the first cell is operable to obtain details of the access mode of candidate neighbouring cells during an initialisation procedure which is used to exchange application layer protocol data between RAN nodes (e.g. the X2 Setup procedure in LTE). The access mode details, once acquired are then stored for future reference (e.g. to allow decisions to be made on handover) (step 904).

Similarly, the radio access network node may be operable to receive and extract updated information on the access mode of candidate neighbouring cells (e.g. via the X2AP eNB Configuration Update procedure for LTE).

The base station 11, 5 (or RNC 7) is operable to make handover/relocation/redirection decisions for the mobile telephone 3, taking the acquired information on the access mode of candidate neighbouring cells into account as described previously.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

It will be appreciated that whilst the presence or absence of the CSG membership indication flag is described as respectively representing membership and non-membership of the CSG group the component parts of the system may be configured such that the opposite is true (e.g. presence or absence of the CSG membership indication flag respectively representing non-membership and membership). Furthermore, the telephone registration module of the mobile telephone may be operable to generate connection requests for HNBs operating in a hybrid access mode in which the CSG membership indication flag is always present but is set to a first value (e.g. TRUE) when the mobile telephone 3 is a CSG member and to another value (e.g. FALSE) when it is not a member.

Whilst it may not be necessary to include the CSG membership indication flag in connection requests for closed or open access mode HNBs, it will be appreciated that the connection requests in one or both cases may, nevertheless, include such a flag (if appropriate) possibly set to an appropriate value (e.g. TRUE or FALSE).

Whilst specific communication nodes have been described (e.g. HNB, base station, NodeB, RNC) in the description it will be appreciated that the description may apply equally to other nodes having similar functionality. In particular it will be appreciated that the term HNB is used generically to refer to home base stations of any type of network (e.g. LTE, WiMAX etc.) and that similar functionality may be provided by a base station (NodeB) and/or RNC.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction

SA1 requirements for prioritisation in a hybrid HNB are given in [1]:

"In hybrid access mode when services cannot be provided to a CSG member due to a shortage of H(e)NB resources it shall be possible for established communication of non-CSG members via a CSG cell to be diverted from the CSG cell.

In a H(e)NB in hybrid access mode, to minimise the impact of non-CSG established communication on CSG members, it shall be possible for the network to allow the data rate of established PS communication of non-CSG members to be reduced."

In this contribution we analyse the need for prioritisation and propose a solution.

2. Discussion

In [2] it has been decided that the HNB Access Mode will be signalled to the UE as follows:

Open Access Mode→CSG Indicator and CSG Identity are not broadcast

Closed Access Mode→CSG Indicator and CSG Identity are both broadcast

Hybrid Access Mode→CSG Indicator is not broadcast but CSG Identity is broadcast

Thus, a UE camping on a cell served by the Hybrid HNB can know the Access Mode of the HNB as well as whether it is a CSG member of that HNB.

When a UE that is a CSG member of the Hybrid HNB attempts to establish the RRC Connection to this HNB, the UE can provide this information to the HNB via some CSG membership flag. If the UE is not CSG member of the Hybrid HNB, then the UE does not send this flag.

Based on this CSG membership flag the HNB in a congested situation can swiftly make decisions on whether to divert the RRC Connection to another cell (if the UE attempting to access the HNB is not CSG member) or not (if the UE attempting to access the HNB is CSG member).

3. Proposal

It is proposed to introduce a simple flag sent from the UE to the HNB which will indicate the CSG membership of the UE attempting to access the Hybrid HNB.

4. Other Proposals/Possibilities

SRAN—Indicates the Source Radio Access Network

TRAN—Indicates the Target Radio Access Network (Where the UE wants to handover)

Idle Mode

1) The UE reads the System Information broadcast in the SRAN cell on which the UE is camping 2) Among other information the UE reads:
   CSG Indicator (or CSG Indication) IE
   CSG Identity IE
These IEs are set as follows:
   If the SRAN cell is an Open Access Mode:
   CSG Indicator (or CSG Indication) IE=FALSE
   CSG Identity IE not broadcast
   If the SRAN cell is a Hybrid Access Mode:
   CSG Indicator (or CSG Indication) IE=FALSE
   CSG Identity IE broadcast
   If the SRAN cell is a Closed Access Mode:
   CSG Indicator (or CSG Indication) IE=TRUE
   CSG Identity IE broadcast 3) The UE initiates RRC Connection in a Hybrid Access Mode SRAN cell.

If the UE is a CSG member of the SRAN cell, the UE sends the CSG membership flag to the SRAN in the RRC Connection Request message.

If the UE is not a CSG member, the UE does not need to send this flag to the SRAN (or the flag is set to FALSE).

4) The SRAN cell uses the membership flag as follows:

If the SRAN cell is in a congested situation and the UE attempting to access the cell is not a CSG member, the SRAN cell rejects or diverts the UE to another cell (e.g. the neighbouring cell)

If the SRAN cell is in a congested situation and the UE attempting to access the cell is a CSG member, the SRAN cell allows the UE on the cell. The SRAN cell can also decide to divert or reduce the data rate of the existing connections in order to admit the incoming UE connection to the cell.

The SRAN may store this membership flag in order to use it when a connection is established, to determine whether the established connection should be diverted (or the data rate reduced) when congestion occurs later.

Connected Mode

1) The UE is in connected mode and performs the measurements of the neighbouring cells.

2) The UE obtains CSG Indicator (or CSG Indication) IE and CSG Identity IE of the neighbouring cells from the System Information.

3) The UE sends the measurements performed on the neighbouring cells to the SRAN. In the measurement report, the UE sends the CSG membership flag to indicate whether the UE is a CSG member of the neighbouring cell.

4) The SRAN can use this information for the HO decisions as follows:

If the TRAN cell has Hybrid Access Mode, the SRAN may decide not to handover the UE to the TRAN cell if the UE is not a CSG member If the TRAN cell has Closed Access Mode and the UE indicates that it is not a CSG member of the IRAN cell, the SRAN shall not allow the HO of the UE to the TRAN cell.

Obtaining Access Mode Indication

To allow the SRAN to perform HO decisions, it is necessary that the SRAN have the information regarding the Access Mode (Open, Hybrid or Closed) of the neighbouring cells.

The SRAN can obtain this information as follows:
   From the UE via RRC measurement reporting (e.g. Uu interface) or
   From the neighbouring cells via protocol used on the interface between two RAN nodes (e.g. X2AP for LTE).

Access Mode Indication from the UE:

1) The SRAN may ask the UE to report the information on the neighbouring cells.

2) Besides other information the UE reports also the information on the Access Mode of the neighbouring cell (the UE understands the Access Mode of the neighbouring cells from the System Information as described above).
3) The SRAN uses this information for HO decisions and Access Control as explained above.

Access Mode Indication from the neighbouring cells:
1) The SRAN receives information related to the Access Mode of candidate neighbouring cells during the initialisation procedure which is used to exchange application layer protocol between RAN nodes (e.g. X2 Setup procedure in LTE).
2) The SRAN may receive updated information on the Access Mode of candidate neighbouring cells (e.g. via X2AP eNB Configuration Update procedure for LTE).
3) The SRAN uses this information for HO decisions and Access Control as explained above.

Other Possibilities

Two other possibilities for dealing with congestion in Idle mode:

With these two possibilities the SRAN can prevent the non CSG members from accessing when the SRAN node is congested. For these possibilities it is assumed that the SRAN may get the information on the CSG membership from some other node (e.g. Core Network or HNB-GW) and not from the UE.

First Possibility:
1) When the Hybrid SRAN is in a congested situation, the Hybrid SRAN can change "on the fly" the Access Mode from Hybrid to Closed via changing the CSG Indicator (or CSG Indication) IE=TRUE.
2) Only the CSG Members will try to access the Hybrid SRAN.

Second Possibility:
1) The SRAN can broadcast an indication (e.g. "Only CSG members allowed") in the System Information.
2) The UE will read this information and will attempt the RRC Connection only if it is a CSG member.

This application is based upon and claims the benefit of priority from United Kingdom Patent Application No. 0907187.9, filed on Apr. 27, 2009, the disclosure of which is incorporated herein in its entirety by reference.

The invention claimed is:

1. A mobile communication device for connection in a communication network that comprises a base station, the mobile communication device comprising:
   a receiver for receiving information identifying a closed subscriber group (CSG) associated with a home base station that operates, using a hybrid access mode, in which members and non-members are allowed to access the CSG;
   a processor configured to:
      identify the CSG associated with said home base station from the received information;
      determine whether the mobile communication device is a member of the identified CSG associated with said home base station; and
      generate a message comprising a measurement report and including an indication of whether the mobile communication device is a member of the identified CSG, in dependence on a result of a determination to whether the mobile communication device is the member of the identified CSG associated with said home base station; and
   a transmitter for sending said generated message to a base station to which the mobile communication device is connected.

2. A mobile communication device as claimed in claim 1, wherein said message generated in said generating said message comprises a connection request message report, and
   wherein said transmitter is operable to send said message to said home base station.

3. A method performed by a mobile communication device in a communication network that comprises a base station, the method comprising:
   receiving information identifying a closed subscriber group (CSG) associated with a home base station that operates, using a hybrid access mode, in which members and non-members are allowed to access the CSG;
   identifying the CSG associated with said home base station from the received information;
   determining whether the mobile communication device is a member of the identified CSG associated with said home base station;
   generating a message comprising a measurement report and including an indication of whether the mobile communication device is a member of the identified CSG, in dependence on a result of a determination as to whether the mobile communication device is the member of the identified CSG associated with said home base station; and
   sending said generated message to a base station to which the mobile communication device is connected.

4. A method as claimed in claim 3, wherein said message generated in said generating said message comprises a connection request message report, and
   wherein said message is sent to said home base station in said sending said generated message.

5. A mobile communication device for connection in a communication network, the mobile communication device comprising:
   a receiver for receiving information identifying a closed subscriber group (CSG) associated with a home base station that operates, using a hybrid access mode, in which members and non-members are allowed to access the CSG;
   a processor configured to:
      identify the CSG associated with said home base station from the received information;
      determine whether the mobile communication device is a member of the identified CSG associated with said home base station; and
      generate a message comprising a measurement report and including an indication of whether the mobile communication device is a member of the identified CSG, in dependence on a result of a determination as to whether or not the mobile communication device is a member of the identified CSG associated with said home base station; and
   a transmitter for sending said generated message to a base station to which the mobile communication device is connected,
   wherein said indication comprises whether the mobile communication device is the member of the CSG in a target mobile communication device in the measurement report that is generated for neighboring mobile communication devices, and
   wherein, based on said generated message that is sent to the base station, the base station determines a membership status of the mobile communication device to decide an allowability of a handover of the mobile communication device to the target mobile communication device before the handover is initiated.

6. A method performed by a mobile communication device in a communication network, the method comprising:
- receiving information identifying a closed subscriber group (CSG) associated with a home base station that operates, using a hybrid access mode, in which members and non-members are allowed to access the CSG;
- identifying the CSG associated with said home base station from the received information;
- determining whether the mobile communication device is a member of the identified CSG associated with said home base station;
- generating a message comprising a measurement report and including an indication of whether the mobile communication device is a member of the identified CSG, in dependence on a result of a determination as to whether or not the mobile communication device is a member of the identified CSG associated with said home base station; and
- sending said generated message to a base station to which the mobile communication device is connected,
- wherein said indication comprises whether the mobile communication device is the member of the CSG in a target mobile communication device in the measurement report that is generated for neighboring mobile communication devices, and
- wherein, based on said generated message that is sent to the base station, the base station determines a membership status of the mobile communication device to decide an allowability of a handover of the mobile communication device to the target mobile communication device before the handover is initiated.

7. A mobile communication device as claimed in claim 1, wherein the base station determines a membership status of the mobile communication device to decide an allowability of a handover of the mobile communication device.

8. A mobile communication device as claimed in claim 7, wherein the base station determines the membership status before the handover is initiated.

9. A mobile communication device as claimed in claim 8, wherein said indication comprises whether the mobile communication device is the member of the CSG in a target mobile communication device.

10. A method as claimed in claim 3, wherein the base station determines a membership status of the mobile communication device to decide an allowability of a handover of the mobile communication device.

11. A method as claimed in claim 10, wherein the base station determines the membership status before the handover is initiated.

12. A method as claimed in claim 11, wherein said indication comprises whether the mobile communication device is the member of the CSG in a target mobile communication device.

* * * * *